A. M. COX.
SPECTACLES.
APPLICATION FILED OCT. 12, 1916.
1,225,775.
Patented May 15, 1917.
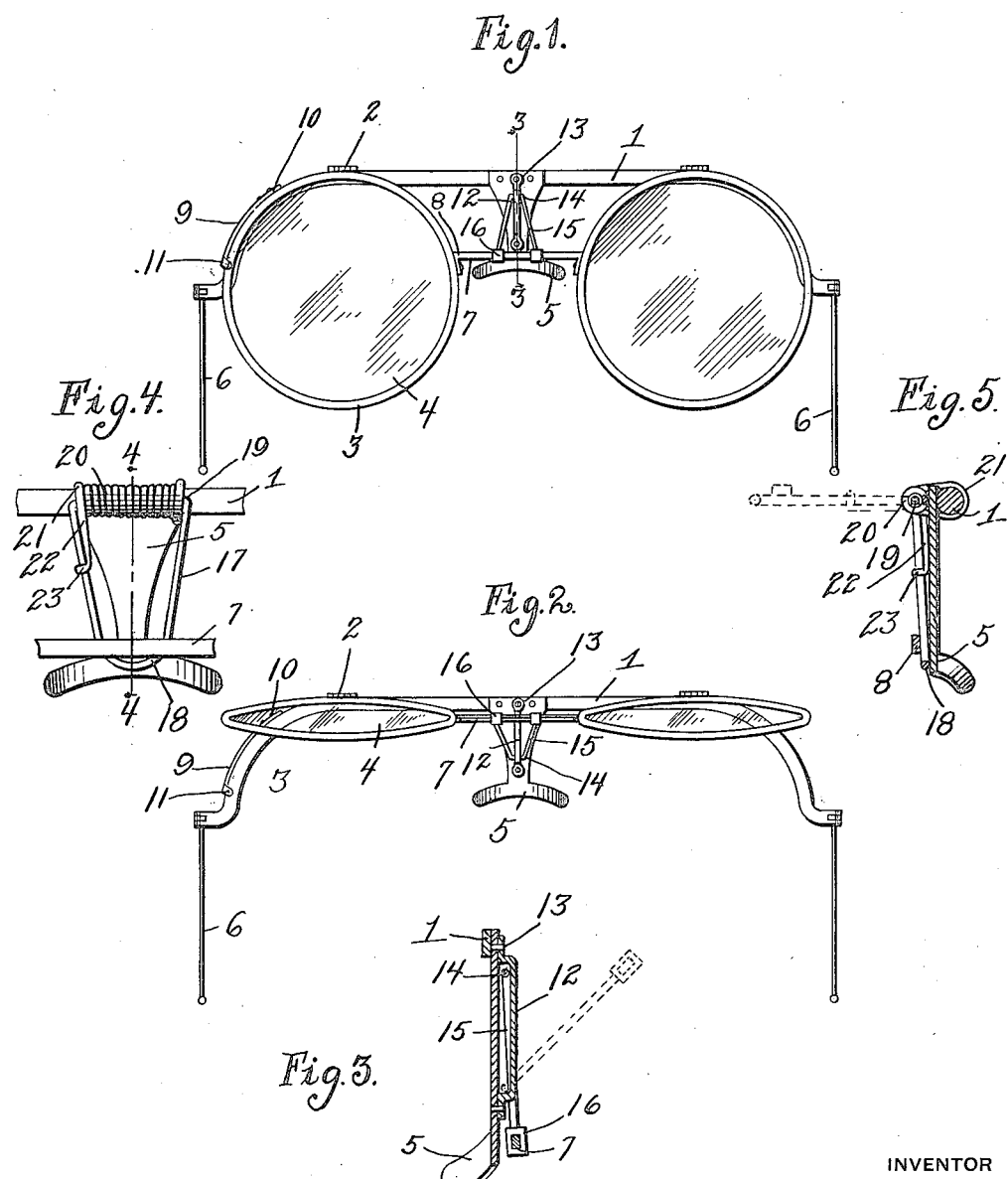
WITNESSES
Arthur K. Moore
Wm. Webster Downing
INVENTOR
Arthur M Cox
BY Richard B Owen
ATTORNEY

UNITED STATES PATENT OFFICE.

ARTHUR M. COX, OF COMMERCE, OKLAHOMA.

SPECTACLES.

1,225,775.

Specification of Letters Patent.

Patented May 15, 1917.

Application filed October 12, 1916. Serial No. 125,241.

*To all whom it may concern:*

Be it known that I, ARTHUR M. Cox, a citizen of the United States, residing at Commerce, in the county of Ottawa and State of Oklahoma, have invented certain new and useful Improvements in Spectacles, of which the following is a specification.

The present invention has reference generally to improvements in that class of inventions known as optics and more particularly relates to improvements in spectacles.

It is the primary aim and object of this invention to provide novel means for releasably holding the lenses of the spectacles in a horizontal plane above the eyes of the user, the improved spectacles being particularly adapted for use by motorists because there is no strain on the eye and the lenses may be quickly swung into a raised or inoperative position without removing the spectacles from their accustomed position.

As an additional object, the invention contemplates the provision of novel means for normally retaining the lenses in a substantially rigid position with respect to the frame.

Among the other aims and objects of the invention may be recited the provision of a device of the character mentioned with a view to compactness and in which the number of parts are few, the construction simple, the cost of production low and the efficiency high.

Other objects as well as the nature, characteristic features and scope of my invention will be more readily understood from the following description taken in connection with the accompanying drawings and pointed out in the claims, forming a part of this specification.

The invention is clearly illustrated in the accompanying drawings, in which:—

Figure 1 is a front elevation of my invention, showing the lenses in an operative position.

Fig. 2 is a similar view, showing the lenses in a raised or inoperative position.

Fig. 3 is an enlarged transverse section taken on line 3—3, looking in the direction in which the arrows point.

Fig. 4 is an enlarged fragmentary front elevation of another form of my invention, and Fig. 5 is a transverse section taken on line 4—4 of Fig. 4.

Similar characters of reference are employed in all of the above described views to indicate corresponding parts.

Referring now more particularly to the accompanying drawings, I provide a supporting frame 1 and have pivotally mounted adjacent the respective curved ends thereof, by means of suitable hinges 2, lens holders 3 which carry suitable lenses 4. A nose-piece or bridge 5 is connected at a point intermediate the ends of the frame 1 and is arranged between the lens holders 3. The usual temples 6 are pivotally connected to the respective ends of the frame. A brace 7 has the respective ends connected to the lens holders 3 by means of a suitable fastening device 8 and by means of this brace both of the lenses may be raised simultaneously.

In order to normally hold the lens holders in substantially rigid relation with respect to the frame, I have provided my improved retaining means, which in the present instance consists of a leaf-spring 9, one end of which is rigidly secured by means of a suitable fastening device 10, at a point adjacent the outer end of the frame, while the opposite end is bent to provide a catch 11 for engagement with the adjacent lens holders 3.

With a view toward providing efficient means for maintaining the lenses in a raised or inoperative position, I have connected the respective ends of an elongated bracket 12 to the front face of the nose-piece by means of a suitable fastening device 13. As is apparent the main portion of this bracket is arranged longitudinally of the nose-piece and in spaced relation therewith. Preparatory to the fastening of the bracket, I have slidably mounted the vertex 14 of a V-shaped support 15 therein, while the outer ends of the support are connected, as indicated by the numeral 16 to the brace 7.

In Figs. 4 and 5, I have shown another form of my invention. In this instance, instead of employing the V-shaped support 15, I have provided a substantially U-shaped support 17 and arranged the vertex or intermediate portion beneath the brace 7, as indicated by the numeral 18. The free ends of the support are bent inwardly to provide lugs 19 which are arranged in the ends of a coil-spring 20, the outer convolutions or coils 21 of which are arranged also about the frame 1 so as to connect the support to the frame. One end of the spring 20 is extended, as indicated by the numeral 22 and terminates in a loop 23 which is engaged about one side of the support 17, while the opposite end is extended to engage the nose-piece 5, so that the tension of the spring will normally be exerted on the support to consequently automatically raise the lens holders when the retaining spring 9 is released.

The operation of the present invention may be reviewed as follows:

By disengaging the catch 11 the lens holders 3 may be raised until the vertex 14 of the support 15 slides in the bracket 12 toward the lower end thereof whereupon the lens holders may be released and supported in a horizontal position by the support. If it is desired to use the supports, it is only necessary to push the support 15 toward the upper end of the bracket whereupon the holders would be moved into a lowered position and engaged by the catch 11. As will be seen from Figs. 4 and 5, when the catch 11 is released, the tension of the spring 20 is normally exerted on the support 17, which is in turn arranged behind the brace 7 and automatically raises the brace and consequently the lens holders 3.

In order to return the frame to an operative position it is necessary to move the lens holders 3 toward the frame so that one of them would be engaged by the catch 11.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having thus fully described my invention, what I claim and desire to secure by Letters Patent is:

1. A device of the character described including a frame, lenses pivoted thereto, a nose-piece connected to the frame, means for bracing the lenses so that they may be moved simultaneously, means for retaining the lenses in an operative position against the frame, and means arranged between the nose-piece and the bracing means for removably holding the lenses in a raised or inoperative position.

2. A device of the character described comprising a spectacle frame consisting of a bar having its opposite ends curved downwardly, lens holders pivotally connected to the bar adjacent its curved ends and adapted to lie in operative position against said curved ends, a nose piece depending from the bar and lying between the lens holders, means connecting said lens holders together so that they may be moved in unison, and means between the nose piece and connecting means for retaining the lens holders in a raised and inoperative position relative to the frame.

3. A device of the character described including a supporting frame, lens holders pivoted thereto, lenses receivable in the holders, means for bracing the lens holders so that they may be moved simultaneously, means for retaining the lens holders in an operative position against the frame, a substantially U-shaped support arranged adjacent the bracing means, and resilient means for receiving the support connected to the support and to the nose-piece so as to exert a tension on the bracing means to automatically swing the lens holders into a raised or inoperative position when the retaining means is released.

4. A device of the character described comprising a spectacle frame consisting of a bar having its opposite ends curved, lens holders pivotally connected to the bar adjacent its curved ends and adapted to lie in operative position against said curved ends, a nose piece projecting from the bar and lying between the lens holders, means connecting said lens holders together so that they may be moved in unison, an arm pivotally connected to the nose piece and in constant engagement with said last mentioned connecting means, resilient means associated with said arm and normally tending to raise said arm whereby said lens holders are moved to an inoperative position, and means for retaining the lens holders in an operative position relative to the frame.

In testimony whereof I affix my signature in presence of two witnesses.

ARTHUR M. COX.

Witnesses:
W. A. WOOD,
B. M. SIMS.